United States Patent
Nakashima et al.

(10) Patent No.: US 8,997,724 B2
(45) Date of Patent: Apr. 7, 2015

(54) SPARK-IGNITION ENGINE

(71) Applicant: KUBOTA Corporation, Osaka-shi, Osaka (JP)

(72) Inventors: Eishin Nakashima, Sakai (JP); Shunji Okano, Sakai (JP); Hiroyuki Kawasoe, Sakai (JP); Tamotsu Ohashi, Sakai (JP); Naoki Inoue, Sakai (JP); Yuki Ozaki, Sakai (JP)

(73) Assignee: KUBOTA Corporation, Osaka-shi, Osaka (JP)

( * ) Notice: Subject to any disclaimer, the term of this patent is extended or adjusted under 35 U.S.C. 154(b) by 0 days.

(21) Appl. No.: 14/188,159

(22) Filed: Feb. 24, 2014

(65) Prior Publication Data

US 2014/0238367 A1    Aug. 28, 2014

(30) Foreign Application Priority Data

Feb. 25, 2013  (JP) ................................. 2013-034449
Feb. 6, 2014  (JP) ................................. 2014-021410
Feb. 6, 2014  (JP) ................................. 2014-021412

(51) Int. Cl.
*F02B 23/08*  (2006.01)
*F02B 75/12*  (2006.01)

(52) U.S. Cl.
CPC ..................... *F02B 75/12* (2013.01)

(58) Field of Classification Search
CPC . F02B 2275/40; F02B 2023/102; F02F 1/242
USPC ............ 123/658, 661, 657, 306, 309, 406.11, 123/608, 143 R, 146.4 R, 193.1, 193.3, 123/193.6; 29/888.04
See application file for complete search history.

(56) References Cited

U.S. PATENT DOCUMENTS

| 4,951,642 | A | * | 8/1990 | Hashimoto et al. ............ 123/657 |
| 5,582,147 | A | * | 12/1996 | Kim .............................. 123/302 |
| 5,720,253 | A | * | 2/1998 | Matoba et al. ................ 123/298 |
| 6,701,883 | B2 | * | 3/2004 | Matsumoto ................ 123/193.5 |
| 7,207,312 | B2 | * | 4/2007 | Inoue et al. .................... 123/310 |
| 2009/0133677 | A1 | * | 5/2009 | Ward ............................. 123/594 |
| 2010/0006061 | A1 | * | 1/2010 | Shibata et al. ................ 123/307 |

FOREIGN PATENT DOCUMENTS

JP    S60-102428 U    7/1985

* cited by examiner

*Primary Examiner* — Noah Kamen
*Assistant Examiner* — Long T Tran
(74) *Attorney, Agent, or Firm* — Panitch Schwarze Belisario & Nadel LLP

(57) ABSTRACT

A spark-ignition engine capable of reducing the content of hydrocarbon in exhaust gas is provided. When viewed from a direction parallel to a cylinder center axis, given a central virtual line passing a squish area maximum-width section and the center of a combustion chamber recessed section, and one area a and the other area b divided by the central virtual line, an intake valve port or an exhaust valve port is opened in one area of any opposed section of opposed sections of the combustion chamber recessed section. A spark-plug attachment hole is formed in the other area of the opposed section, such that, when viewed from the direction parallel to the cylinder center axis, a spark discharge section at a tip of a spark plug does not overlap the central virtual line.

20 Claims, 12 Drawing Sheets

FRONT REAR

SPARK-IGNITION ENGINE

BACKGROUND OF THE INVENTION

1. Field of the Invention

The present invention relates to a spark-ignition engine, and in particular, to a spark-ignition engine capable of reducing the content of hydrocarbon in exhaust gas.

2. Description of Related Art

A conventional spark-ignition engine includes a cylinder head-side squish surface provided on the outer periphery of a combustion chamber roof of a cylinder head, a piston head-side squish surface provided on the outer periphery of a piston head as opposed to the cylinder head-side squish surface, a combustion chamber recessed section recessed at the center of the combustion chamber roof of the cylinder head, an intake valve port provided on one opposed section of opposed sections of the combustion chamber recessed sections, an exhaust valve port provided on the other opposed section, and a spark-plug attachment hole facing the combustion chamber recessed section, in which the cylinder head-side squish surface and the piston head-side squish surface are upwardly inclined toward the combustion chamber recessed section, and in the vicinity of a compression top dead center, a squish flow is ejected from a squish area formed between the cylinder head-side squish surface and the piston head-side squish surface toward the center of the combustion chamber recessed section (refer to, for example, Japanese Utility Model JP 60-102428 U).

This kind of engine can advantageously cause disturbance of a fuel-air mixture in the combustion chamber recessed section by the squish flow, thereby increasing the propagation speed of flame generated by spark discharge of a spark plug to prevent engine knocking.

However, according to the conventional art, a spark discharge section at a tip of the spark plug is disposed at a position in the vicinity of a compression top dead center directly hit by a largest squish flow ejected from a squish area maximum-width section, which is disadvantageous.

Problem:

The content of hydrocarbon in exhaust gas increases.

Since the spark discharge section at the tip of the spark plug is disposed in the vicinity of a compression top dead center directly hit by the largest squish flow ejected from the squish area maximum-width section, a small fire source occurred in the spark discharge section immediately after ignition is blown out by the largest squish flow to prevent propagation of flame in the combustion chamber, increasing the content of hydrocarbon in exhaust gas due to incomplete combustion of fuel.

BRIEF SUMMARY OF THE INVENTION

An object of the present invention is to provide a spark-ignition engine capable of reducing the content of hydrocarbon in exhaust gas.

Embodiments of the invention include the following features:

As shown in FIG. 1, FIG. 2, and FIGS. 10(A) and 10(B), in a spark-ignition engine including a cylinder head-side squish surface (3) provided on the outer periphery of a combustion chamber roof (2) of a cylinder head (1), a piston head-side squish surface (5) provided on the outer periphery of a piston head (4) as opposed to the cylinder head-side squish surface (3), a combustion chamber recessed section (6) recessed at the center of the combustion chamber roof (2) of the cylinder head (1), an intake valve port (9) provided on one opposed section 7 of opposed sections (7)(8) of the combustion chamber recessed section (6), an exhaust valve port (10) provided on the other opposed section (8), and a spark-plug attachment hole (11) facing the combustion chamber recessed section (6);

As shown in FIG. 2 and FIG. 10(B), the cylinder head-side squish surface (3) and the piston head-side squish surface (5) are upwardly inclined toward the combustion chamber recessed section (6), and in the vicinity of a compression top dead center, a squish flow is ejected from a squish area (12) formed between the cylinder head-side squish surface (3) and the piston head-side squish surface (5) toward the center of the combustion chamber recessed section (6); and As shown in FIG. 1 and FIG. 10(A), when viewed from the direction parallel to a cylinder center axis (13), given a central virtual line (15) passing a squish area maximum-width section (14) and the center of the combustion chamber recessed section (6), and one area (a) and the other area (b) that are divided by the central virtual line (15);

Either of the intake valve port (9) or the exhaust valve port (10) is provided in one area (7a) of any opposed section (7) of the opposed sections (7)(8) of the combustion chamber recessed section (6), and the spark-plug attachment hole (11) is provided in the other area (7b) of the opposed section (7); and As shown in FIG. 1 and FIG. 10(A), a spark discharge section (16) at a tip of a spark plug (24) is provided at a position not to overlap the central virtual line (15) when viewed from the direction parallel to the cylinder center axis (13).

First Aspect:

A first aspect according to the invention achieves the following effect: The content of hydrocarbon in exhaust gas can be reduced.

As shown in FIG. 1, when viewed from the direction parallel to the cylinder center axis (13), since the spark discharge section (16) at the tip of the spark plug (24) is provided at the position not to overlap the central virtual line (15), the largest squish flow (14a) ejected from the squish area maximum-width section (14) in the vicinity of the compression top dead center does not directly hit against the spark discharge section (16) at the tip of the spark plug (24), resulting in that a small fire source occurred in the vicinity of the spark discharge section (16) immediately after ignition is hardly blown out by the largest squish flow (14a), and flame propagation in the combustion chamber is smoothly performed to prevent incomplete combustion and reduce the content of hydrocarbon in the exhaust gas (26).

According to the second through twelfth aspects of the invention, the following effect can be achieved as in first aspect: The content of hydrocarbon in exhaust gas can be reduced.

Second Aspect:

As shown in FIG. 1 and FIG. 10(A), since one area (8a) of the other opposed section (8) serves as the intake guide surface (20), and the intake guide surface (20) has the center axis (9a) in common with the intake valve port (9) and is the partial circumferential surface of the conical frustum extending toward the cylinder (19), the intake air (25) sucked through the intake valve port (9) in the intake stroke smoothly flows into the combustion chamber recessed section (6) along the intake guide surface (20) to increase the intake efficiency, resulting in that flame propagation in the combustion chamber is smoothly performed to prevent incomplete combustion and reduce the content of hydrocarbon in the exhaust gas (26).

In a valve overlap period when the intake valve (31) and the exhaust valve (21) are opened in the vicinity of the exhaust top dead center, the exhaust gas (26) in the combustion chamber recessed section (6) is pushed into the exhaust valve port (10) by the intake air (25) guided from the intake valve port (9) to the exhaust valve port (10) along the intake guide surface (20) to increase the scavenging efficiency, resulting in that flame propagation in the combustion chamber is smoothly performed to prevent incomplete combustion and reduce the content of hydrocarbon in the exhaust gas (26).

Third Aspect:

As shown in FIG. 2 and FIG. 10(B), since the largest squish flow (14a) ejected from the squish area maximum-width section (14) in the vicinity of the exhaust top dead center is directed to the exhaust port opposing surface (21a) of the valve head of the opened exhaust valve (21), the exhaust gas (26) in the vicinity of the exhaust valve port (10) together with the largest squish flow (14a) hit against the exhaust port opposing surface (21a) of the valve head of the exhaust valve (21) and enters into the exhaust valve port (10) reverberatively to increase the scavenging efficiency, resulting in that flame propagation in the combustion chamber is smoothly performed to prevent incomplete combustion and reduce the content of hydrocarbon in the exhaust gas (26).

Fourth Aspect:

As shown in FIG. 1 and FIG. 10(A), since the end part (22) of the combustion chamber recessed section (6) located between the spark-plug attachment hole (11) and the exhaust valve port (10) has the center axis (10a) in common with the exhaust valve port (10), and serves as the exhaust guide surface (23) that is the partial circumferential surface of the conical frustum extending toward the cylinder (19), the exhaust gas (26) in the combustion chamber recessed section (6) is smoothly guided to the exhaust valve port (10) along the exhaust guide surface (23) in an exhaust stroke to increase the scavenging efficiency, resulting in that flame propagation in the combustion chamber is smoothly performed to prevent incomplete combustion and reduce the content of hydrocarbon in the exhaust gas (26).

Fifth Aspect:

As shown in FIG. 2, since the spark discharge section (16) is disposed in the spark-plug attachment hole (11), the squish flow hardly hits against the spark discharge section (16) at the tip of the spark plug (24), a small fire source occurred in the vicinity of the spark discharge section (16) immediately after ignition is hardly blown out by the squish flow, and flame propagation in the combustion chamber is smoothly performed to prevent incomplete combustion and reduce the content of hydrocarbon in the exhaust gas (26).

Sixth Aspect:

As shown in FIGS. 10(A) and 10(B), since the spark-plug attachment hole (11) is provided at the bottom end of the spark-plug recessed section (18), the spark discharge section (16) at the tip of the spark plug (24) does not largely protrude into the combustion chamber recessed section (6), resulting in that the squish flow hardly hits against the spark discharge section (16), a small fire source occurred in the vicinity of the spark discharge section (16) immediately after ignition is hardly blown out by the squish flow, and flame propagation in the combustion chamber is smoothly performed to prevent incomplete combustion and reduce the content of hydrocarbon in the exhaust gas (26).

Seventh Aspect:

As shown in FIG. 10(A), when viewed from the direction parallel to the cylinder center axis (13), since the spark-plug recessed section (18) is provided at the position not to overlap the central virtual line (15), the spark-plug recessed section (18) is not directly hit by the largest squish flow, resulting in that a small fire source occurred in the spark-plug recessed section (18) immediately after ignition is hardly blown out by the largest squish flow, and flame propagation in the combustion chamber is smoothly performed to prevent incomplete combustion and reduce the content of hydrocarbon in the exhaust gas (26).

Eighth Aspect:

As shown in FIG. 10(B), since the inner circumferential surface (18a) of the spark-plug recessed section (18) has the central axis (11a) in common with the spark-plug attachment hole (11), and is the partial circumferential surface of the conical frustum extending toward the combustion chamber recessed section (6), flame growing in the spark-plug recessed section (18) extends along the inner circumferential surface (18a) of the spark-plug recessed section (18), and propagates to a wide area of the combustion chamber recessed section (6), resulting in that flame propagation in the combustion chamber is smoothly performed to prevent incomplete combustion and reduce the content of hydrocarbon in the exhaust gas (26).

Ninth Aspect:

As shown in FIG. 10(B), since the spark discharge section (16) at the tip of the spark plug (24) is disposed in the spark-plug recessed section (18), the squish flow hardly hits against the spark discharge section (16) at the tip of the spark plug (24), resulting in that a small fire source occurred in the vicinity of the spark discharge section (16) immediately after ignition is hardly blown out by the largest squish flow, and flame propagation in the combustion chamber is smoothly performed to prevent incomplete combustion and reduce the content of hydrocarbon in the exhaust gas (26).

Tenth Aspect:

As shown in FIG. 5, since the intake air (25)(25) bent by the curved ports (27c)(27c) passes through the straight ports (27d)(27d) and is sucked from the intake valve ports (9)(9) along a wall between the cylinders, vaporization of the fuel in each cylinder (19) is promoted by swirls (41)(41) that absorbs heat near a high-temperature wall between the cylinders, resulting in that flame propagation in the combustion chamber is smoothly performed to prevent incomplete combustion and reduce the content of hydrocarbon in the exhaust gas (26).

Further, the smooth curved ports (27c)(27c), the short straight ports (27d)(27d), and the intake valve ports (9)(9) away from the partition wall (28) can reduce the flow resistance of the intake air (25)(25) into the cylinders (19)(19), increase the flow rate of the swirls (41)(41), and vaporization of the fuel is promoted, resulting in that flame propagation in the combustion chamber is smoothly performed to prevent incomplete combustion and reduce the content of hydrocarbon in the exhaust gas (26).

Eleventh Aspect:

As shown in FIG. 6(A), since the intake valve (31) is formed of the poppet valve, and the fuel (32) injected from the fuel injector (30) hits against the valve head (31a) of the intake valve (31), vaporization of the fuel (32) is promoted by heat of the valve head (31a) of the intake valve (31) that absorbs combustion heat of the combustion chamber, resulting in that flame propagation in the combustion chamber is smoothly performed to prevent incomplete combustion and reduce the content of hydrocarbon in the exhaust gas (26).

Twelfth Aspect:

As shown in FIGS. 6(A) and 6(B), since the fuel (32) is injected from the fuel injector (30) to the intake port (27) within the crank angle range (40) from preceding 40 degrees to subsequent 30 degrees of the bottom dead center (39) partitioning the explosion stroke (37) and the exhaust stroke (38), vaporization of the fuel (32) is promoted by heat of the valve head (31a) of the intake valve (31) that absorbs combustion heat and exhaust heat of the combustion chamber, resulting in that flame propagation in the combustion chamber is smoothly performed to prevent incomplete combustion and reduce the content of hydrocarbon in the exhaust gas (26).

Thirteenth Aspect:

According to a thirteenth aspect of the invention, the following effect can be achieved: Manufacturing costs of an engine can be reduced, in addition to the effects achieved by the first through twelfth aspects of the invention.

Since the exhaust treatment member (35) is made of stainless steel and the surface of the stainless steel member makes contact with the exhaust gas (26), the inexpensive exhaust treatment member (35) that does not require a catalyst component of noble metal can be adopted, reducing manufacturing costs of the engine.

According to the thirteenth through nineteenth aspects of the invention: The contents of hydrocarbon and $NO_x$ in exhaust gas can be reduced.

As shown in FIG. 7 or FIG. 12, since the exhaust muffler (34) includes the muffling chambers (34a)(34b), the exhaust treatment member (35) is located between the exhaust port (33) and the muffling chambers (34a)(34b) and is made of stainless steel, and the surface of the stainless steel material makes contact with the exhaust gas (26), hydrocarbon in the exhaust gas (26) before entering into the muffling chambers (34a)(34b) burns on the surface of the stainless steel material with high-temperature exhaust heat to reduce the content of hydrocarbon in the exhaust gas (26).

Fourteenth Aspect:

The content of $NO_x$ (nitrogen oxides) in the exhaust gas (26) can be also reduced. It is due to that the surface of the stainless steel material serves as a reduction catalyst, NOx in the exhaust gas (26) is reduced on the surface of the stainless steel material by high-temperature exhaust heat to become nitrogen molecules, thereby clearing the exhaust gas (26).

As shown in FIG. 7, since the exhaust treatment member (35) is disposed in the exhaust manifold (36), the temperature of the exhaust gas (26) passing the exhaust treatment member (35) is high, thereby improving the hydrocarbon-burning function of the exhaust treatment member (35) to reduce the content of hydrocarbon in the exhaust gas (26).

Further, the content of $NO_x$ in the exhaust gas (26) can be reduced. It is due to that the temperature of the exhaust gas (26) passing the exhaust treatment member (35) is high, thereby improving the function of the exhaust treatment member (35) as a reduction catalyst.

Fifteenth Aspect:

As shown in FIG. 7, since the exhaust treatment member (35) is disposed in the collector section (36a) of the exhaust manifold (36), the exhaust treatment member (35) is disposed at the position where the exhaust gas (26) merges, and the temperature of the exhaust gas (26) passing the exhaust treatment member (35) is high to improve the hydrocarbon-burning function of the exhaust treatment member (35) and reduce the content of hydrocarbon in the exhaust gas (26).

Further, the content of $NO_x$ in the exhaust gas (26) can be reduced. It is due to that the temperature of the exhaust gas (26) passing the exhaust treatment member (35) is high, thereby improving the function of the exhaust treatment member (35) as a reduction catalyst.

Fifteenth Aspect:

As shown in FIG. 7, since the circumferential wall (36d) of the collector section (36a) into which the exhaust treatment member (35) is incorporated is disposed along the circumferential wall (36c) of the branch section (36b) of the exhaust manifold (36), the heat-retaining property of the exhaust treatment member (35) is high, thereby improving the hydrocarbon-burning function of the exhaust treatment member (35) to reduce the content of hydrocarbon in the exhaust gas (26).

Further, the content of $NO_x$ in the exhaust gas (26) can be reduced. It is due to that the heat-retaining property of the exhaust treatment member (35) is high, thereby improving the function of the exhaust treatment member (35) as a reduction catalyst.

Seventeenth Aspect:

As shown in FIG. 12, since the exhaust treatment member (35) is disposed in the exhaust inlet (34d) of the exhaust muffler body (34c), the temperature of the exhaust gas (26) passing the exhaust treatment member (35) is high to improve the hydrocarbon-burning function of the exhaust treatment member (35) and reduce the content of hydrocarbon in the exhaust gas (26).

Further, the content of $NO_x$ in the exhaust gas (26) can be reduced. It is due to that the temperature of the exhaust gas (26) passing the exhaust treatment member (35) is high, thereby improving the function of the exhaust treatment member (35) as a reduction catalyst.

Eighteenth Aspect:

As shown in FIG. 12, since the circumferential wall (34e) of the exhaust inlet (34d) of the exhaust muffler body (34c) into which the exhaust treatment member (35) is incorporated is disposed along the circumferential wall (36c) of the branch section (36b) of the exhaust manifold (36), the heat-retaining property of the exhaust treatment member (35) is high, thereby improving the hydrocarbon-burning function of the exhaust treatment member (35) to reduce the content of hydrocarbon in the exhaust gas (26).

Further, the content of $NO_x$ in the exhaust gas (26) can be reduced. It is due to that the heat-retaining property of the exhaust treatment member (35) is high, thereby improving the function of the exhaust treatment member (35) as a reduction catalyst.

Nineteenth Aspect:

Since the exhaust treatment member (35) is formed of the three-dimensional mesh structure made of the stainless steel material, the surface area of the stainless steel material is large, thereby improving the hydrocarbon-burning function of the exhaust treatment member (35) to reduce the content of hydrocarbon in the exhaust gas (26).

Further, the content of $NO_x$ in the exhaust gas (26) can be reduced. It is due to that the surface area of the stainless steel material is large, thereby improving the function of the exhaust treatment member (35) as a reduction catalyst.

Twentieth Aspect:

According to the twentieth aspect of the invention, the content of hydrocarbon in exhaust gas can be reduced.

Since the exhaust treatment member (35) is formed of the stainless steel honeycomb, the surface area of the stainless steel material is large, thereby improving the exhaust-cleaning function of the exhaust treatment member (35) to reduce the content of hydrocarbon in the exhaust gas (26).

Further, the content of $NO_x$ in the exhaust gas (26) can be reduced. It is due to that the surface area of the stainless steel material is large, thereby improving the function of the exhaust treatment member (35) as a reduction catalyst.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 6(A) is a vertical sectional view of a cylinder head and its surroundings, and FIG. 6(B) is a view for illustrating a fuel injection timing;

FIG. 10 are views for illustrating a spark-ignition engine in accordance with a Second embodiment of the present invention.

DETAILED DESCRIPTION OF THE INVENTION

Figure 10A:
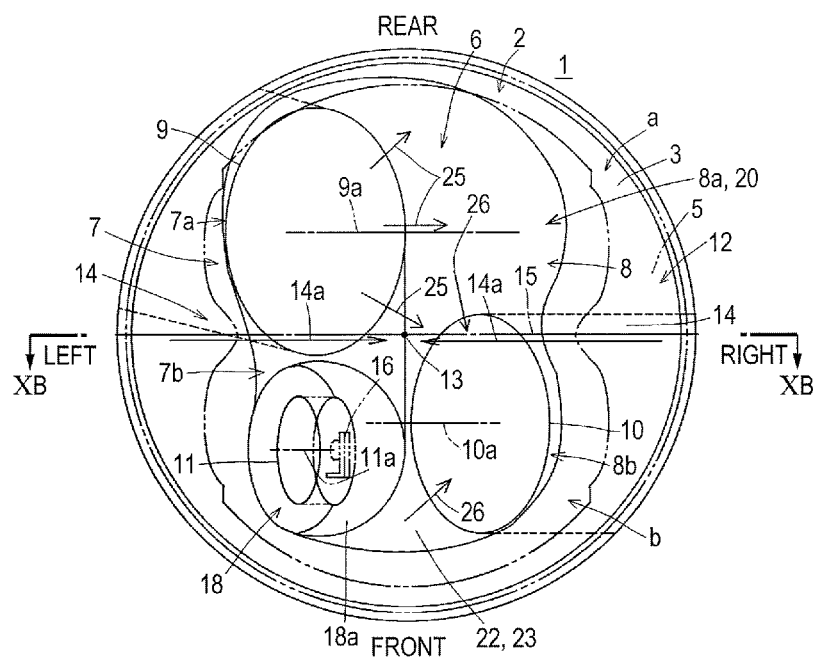
FIG. 10(A) is a view superimposing a piston head squish surface onto a bottom view of a combustion chamber roof and its surroundings.
Figure 10B:
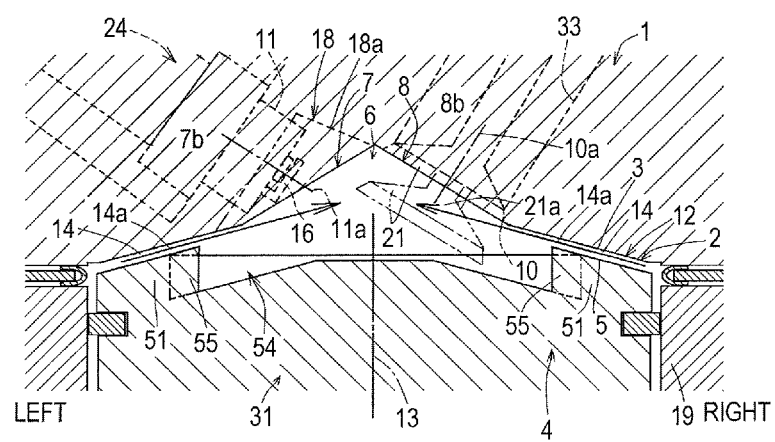
FIG. 10(B) is a sectional view taken along a line XB-XB in FIG. 10(A)
Figure 11:
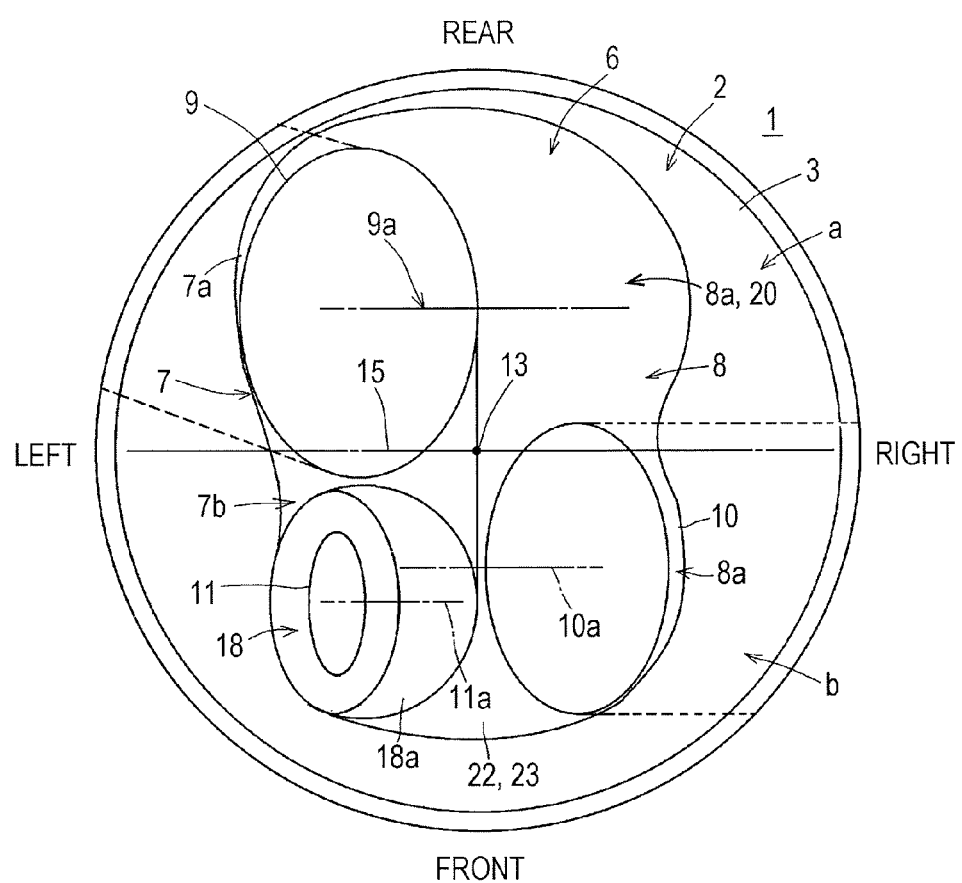
FIG. 11 is a bottom view of the combustion chamber roof and its surroundings of the engine in FIG. 10.
Figure 12:
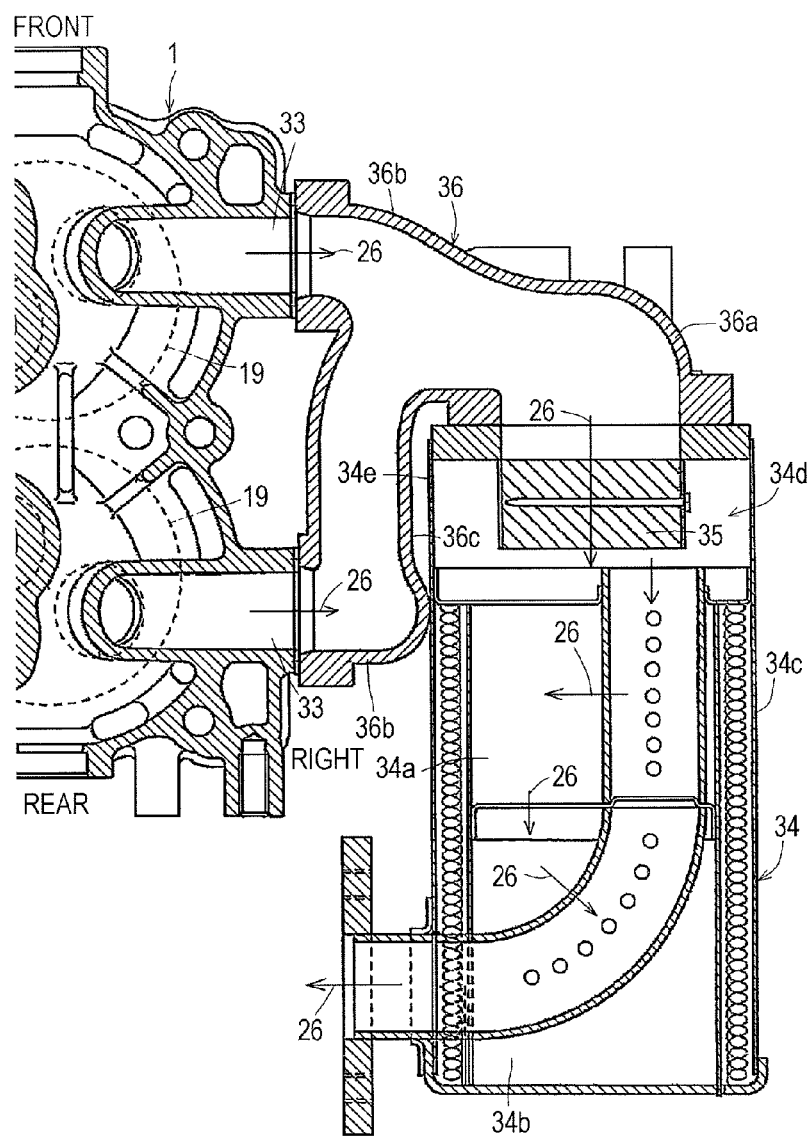
FIG. 12 is a view of a spark-ignition engine in accordance with Third embodiment of the present invention, which corresponds to FIG. 7.

FIGS. 1 to 9 are views for illustrating a spark-ignition engine in accordance with First embodiment of the present invention, FIGS. 10 and 11 are views for illustrating a spark-ignition engine in accordance with Second embodiment of the present invention, FIG. 12 is a view for illustrating a spark-ignition engine in accordance with Third embodiment of the present invention, and in each embodiment, a water-cooled vertical straight two-cylinder gasoline engine is described.

The First embodiment will be described below. A summary of the engine is as follows.

Figure 9:
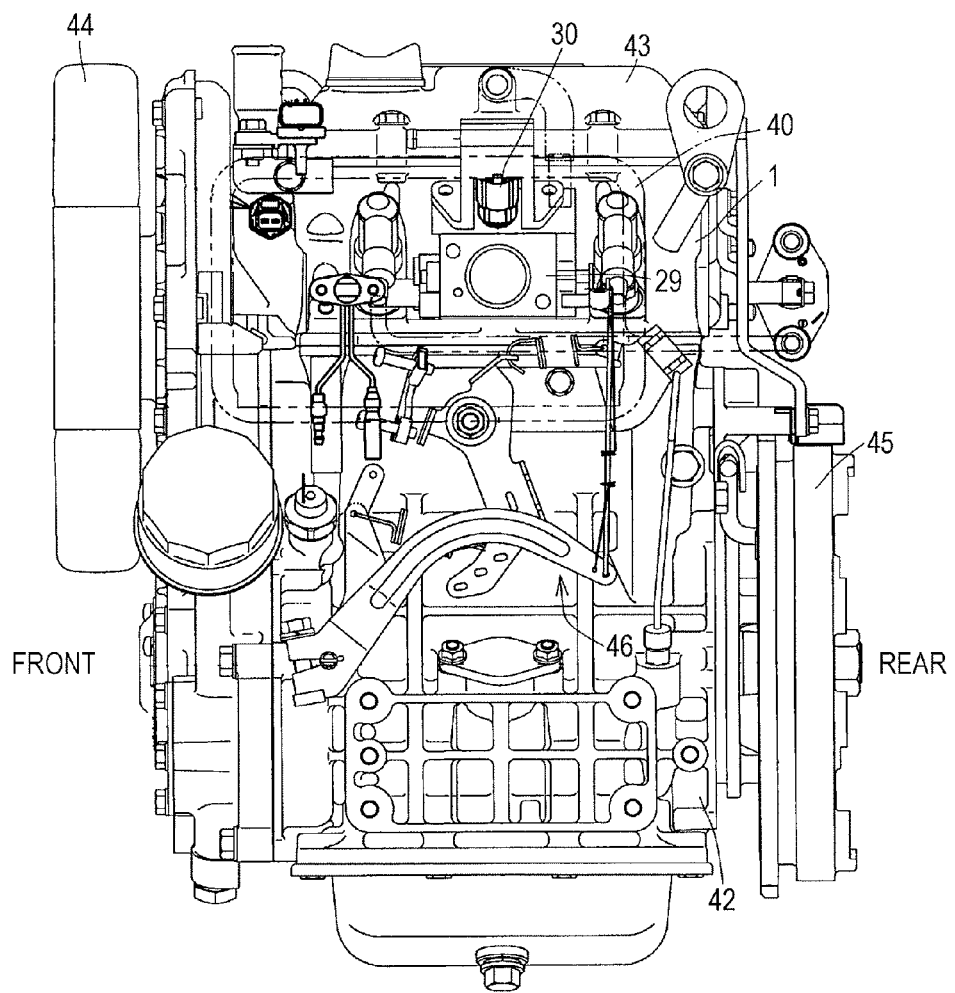
FIG. 9 is a side view of the engine in FIG. 1.

As shown in FIG. 9, a cylinder head (1) is assembled to the upper part of a cylinder block (42), a cylinder head cover (43) is assembled to the upper part of the cylinder head (1), an engine cooling fan (44) is disposed in front of the cylinder block (42), and a flywheel (45) is disposed in the rear of the cylinder block (42).

Figure 8:
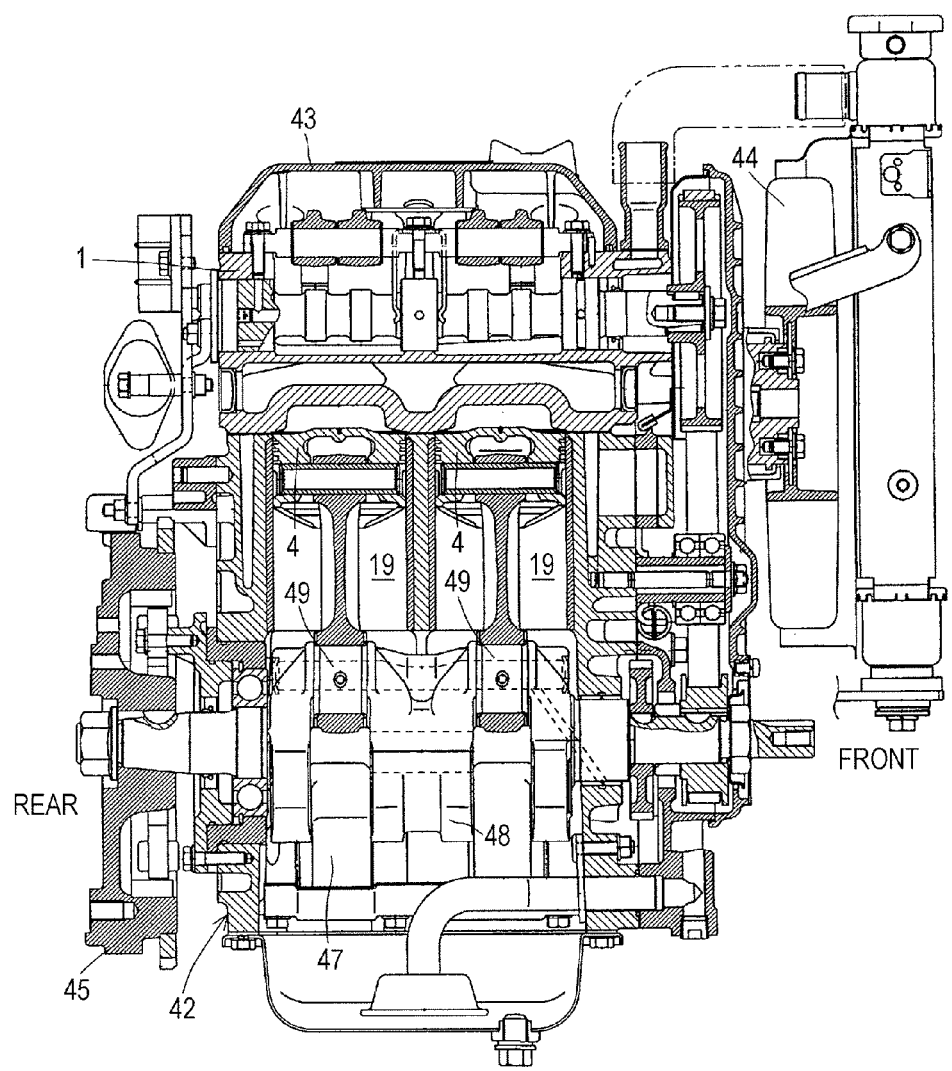
FIG. 8 is a vertical cross-sectional side view of the engine in FIG. 1.

A throttle body (29) is assembled to the left side surface of the cylinder head (1), a fuel injector (30) is assembled to the throttle body (29), and a mechanical governor 46 is disposed on the left side of the cylinder block (42). As shown in FIG. 8, the cylinder block (42) is provided with a pair of front and rear cylinders (19)(19), and a piston head (4) is fitted into each cylinder (19). A crank shaft 48 is mounted in a crank case 47 of the cylinder block (42), and the crank pin angle of a pair of front and rear crank pins (49)(49) of the crank shaft 48 is set to 360 degrees.

A combustion chamber is configured as follows.

Figure 1:
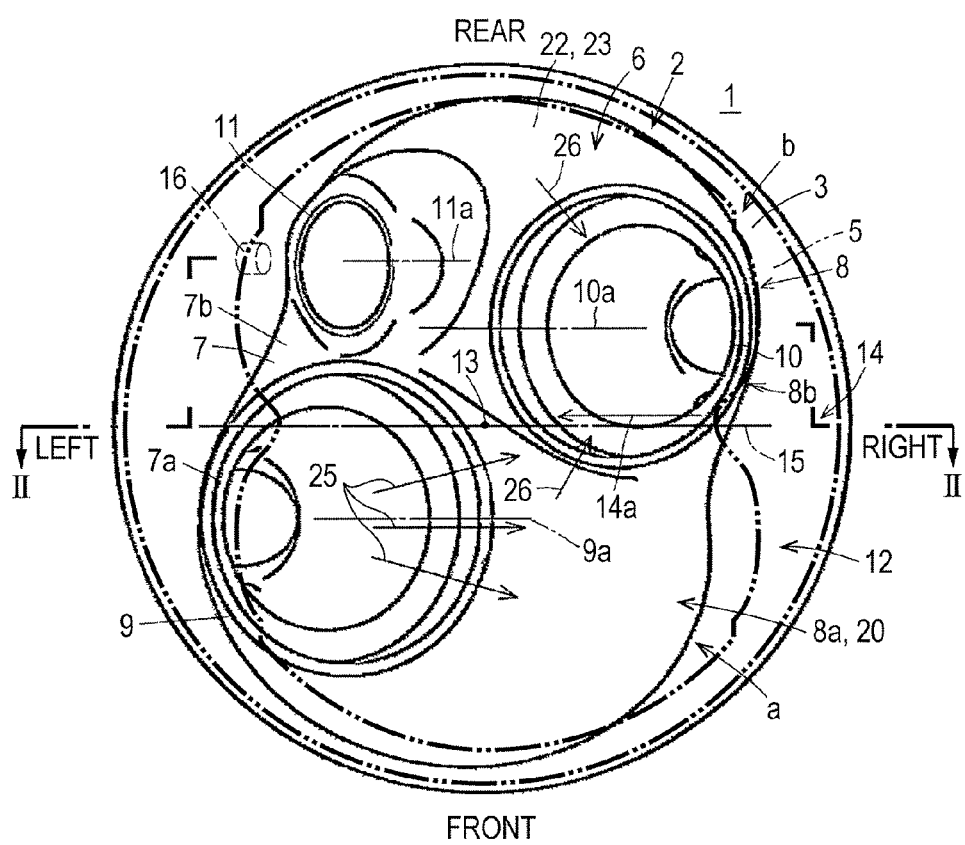
FIG. 1 is a view superimposing a piston head squish surface onto a bottom view of a combustion chamber roof and its surroundings of a spark-ignition engine in accordance with an embodiment of the present invention.
Figure 2:
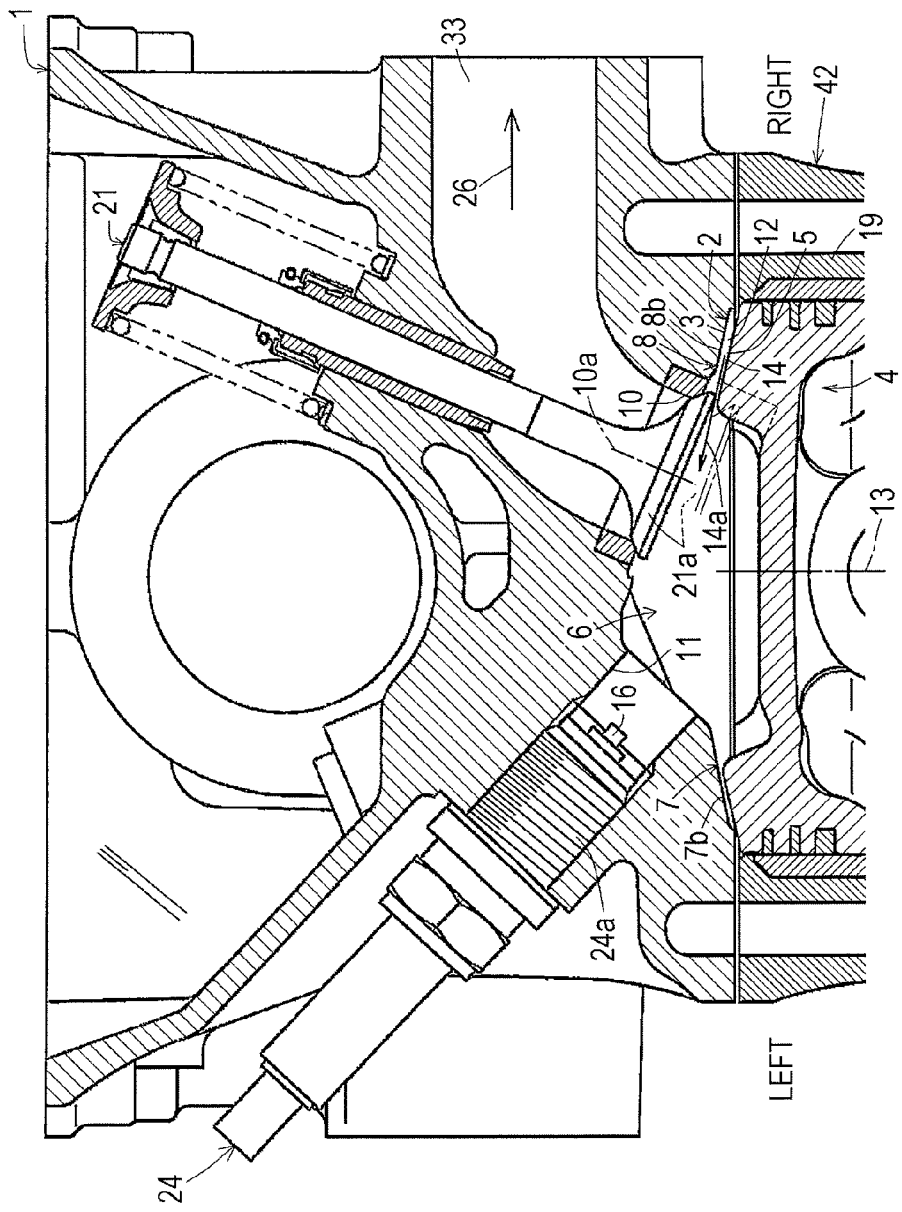
FIG. 2 is a sectional view taken along a line II-II in FIG. 1.
Figure 3:
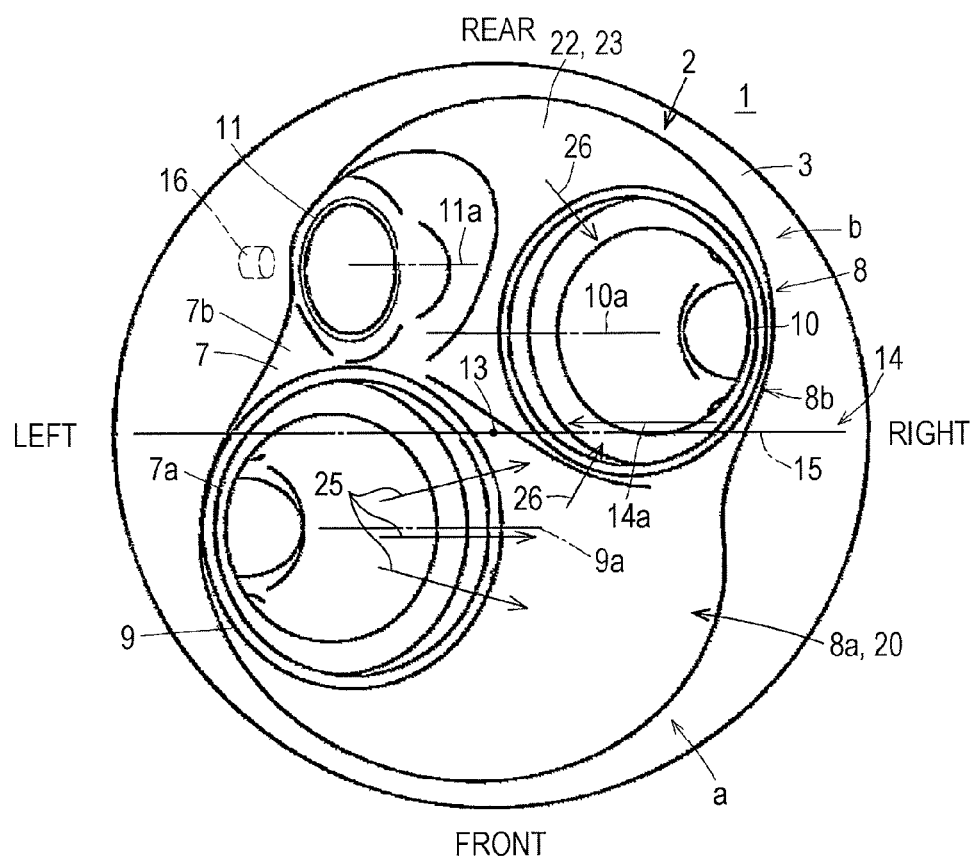
FIG. 3 is a bottom view of the combustion chamber roof and its surroundings of the engine in FIG. 1.

As shown in FIG. 1 and FIG. 2, there are provided a cylinder head-side squish surface (3) provided on the outer periphery of a combustion chamber roof (2) of the cylinder head (1), a piston head-side squish surface (5) provided on the outer periphery of the piston head (4) as opposed to the cylinder head-side squish surface (3), a combustion chamber recessed section (6) recessed at the center of the combustion chamber roof (2) of the cylinder head (1), and intake valve port (9) provided on one opposed section (7) of opposed sections (7)(8) of the combustion chamber recessed section (6), an exhaust valve port (10) provided on the other opposed section (8), and a spark-plug attachment hole (11) facing the combustion chamber recessed section (6).

As shown in FIG. 2, the cylinder head-side squish surface (3) and the piston head-side squish surface (5) are upwardly inclined toward the combustion chamber recessed section (6), and in the vicinity of a compression top dead center, a squish flow is ejected from a squish area (12) formed between the cylinder head-side squish surface (3) and the piston head-side squish surface (5) toward the center of the combustion chamber recessed section (6).

Arrangement of a spark discharge section (16) at a tip of a spark plug (24) is as follows.

As shown in FIG. 1, when viewed from a direction parallel to a cylinder center axis (13), given a central virtual line (15) passing a squish area maximum-width section (14) and the center of the combustion chamber recessed section (6), and one area (a) and the other area (b) that are divided by the central virtual line (15), following configuration is realized.

The intake valve port (9) is provided in one area (7a) of any opposed section (7) of the opposed sections (7)(8) of the combustion chamber recessed section (6), and the spark-plug attachment hole (11) is provided in the other area (7b) of the opposed section (7), as shown in FIG. 1 and FIG. 10(A), so that the spark discharge section (16) at the tip of the spark plug is provided at a position not to overlap the central virtual line (15) when viewed from the direction parallel to the cylinder center axis (13).

The exhaust valve port (10) may be provided at the position of the intake valve port (9).

The piston head (4) is configured as follows.

Figure 4:
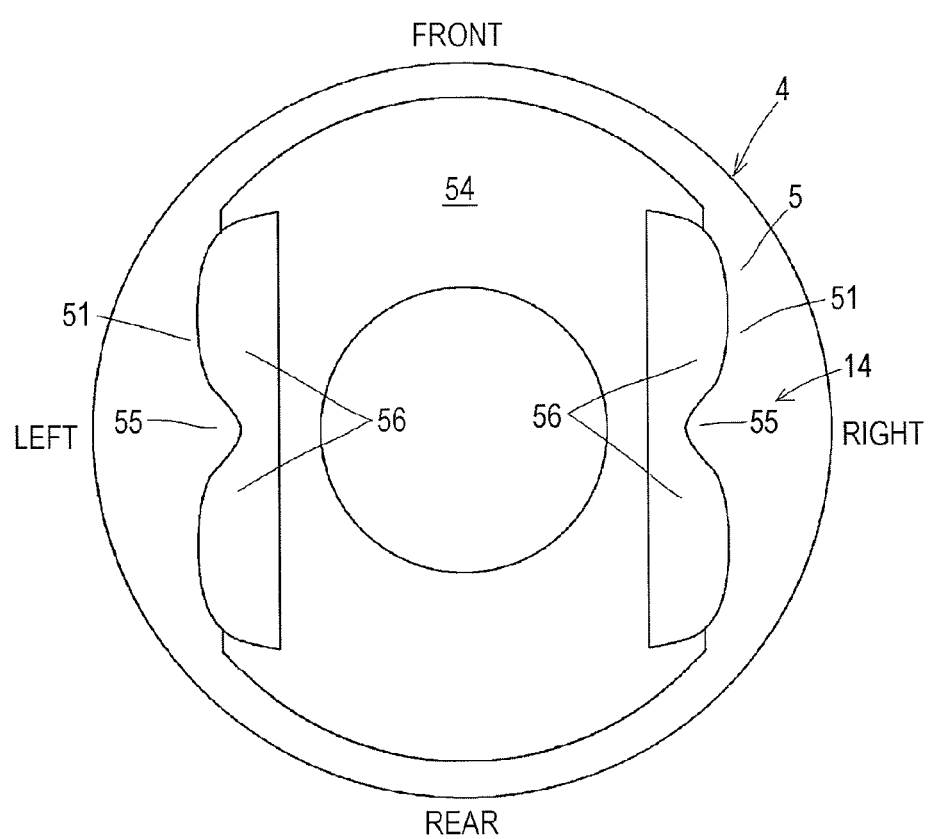
FIG. 4 is a plan view of a piston head used in the engine in FIG. 1.

As shown in FIG. 2, a cavity (54) is formed in the piston head (4), and as shown in FIG. 4, a pair of right and left protruding sections (55)(55) protruding from the center in the frontward and rearward direction toward the center of the cavity (54) are provided on right and left side walls (51)(51) of the cavity (54), and the squish area maximum-width section (14) is formed on the right protruding section (55) side. Recesses (56)(56) provided in front of and in the rear of each protruding section (55) are used as valve recesses for an intake valve (31) and an exhaust valve (21).

An intake guide surface (20) is configured as follows.

As shown in FIG. 1, the intake valve port (9) is provided in one area (7a) of one opposed section 7 of the combustion chamber recessed section (6), and the exhaust valve port (10) is provided in the other area (8b) of the other opposed section (8).

The one area (8a) of the other opposed section (8) serves as the intake guide surface (20), and the intake guide surface (20) has a center axis (9a) in common with the intake valve port (9), and is a partial circumferential surface of a conical frustum extending toward the cylinder (19).

A largest squish flow (14a) is directed as follows.

As shown in FIG. 1, when viewed from the direction parallel to cylinder center axis (13), the exhaust valve port (10) is provided in a position so as to overlap the central virtual line (15).

As shown in FIG. 2, the largest squish flow (14a) ejected from the squish area maximum-width section (14) in the vicinity of an exhaust top dead center is directed to an exhaust port opposing surface (21a) at a valve head of the opened exhaust valve (21).

An exhaust guide surface (23) is configured as follows.

As shown in FIG. 1, when viewed from the direction parallel to the cylinder center axis (13), in the other area (b) located on one side of the central virtual line (15), the spark-plug attachment hole (11) is provided in one opposed section (7) of the combustion chamber recessed section (6), and the exhaust valve port (10) is provided in the other opposed section (8).

An end part (22) of the combustion chamber recessed section (6) located between the spark-plug attachment hole (11) and the exhaust valve port (10) has a center axis (10a) in common with the exhaust valve port (10), and serves as the exhaust guide surface (23) that is a partial circumferential surface of a conical frustum extending toward the cylinder (19).

The spark-plug attachment hole (11) is a female screw hole, and a male screw (24a) of the spark plug (24) is screwed into the hole.

As shown in FIG. 2, all of the spark discharge section (16) is disposed in the spark-plug attachment hole (11). Part of the spark discharge section (16) may be disposed in the spark-plug attachment hole (11).

An intake port (27) is configured as follows.

Figure 5:
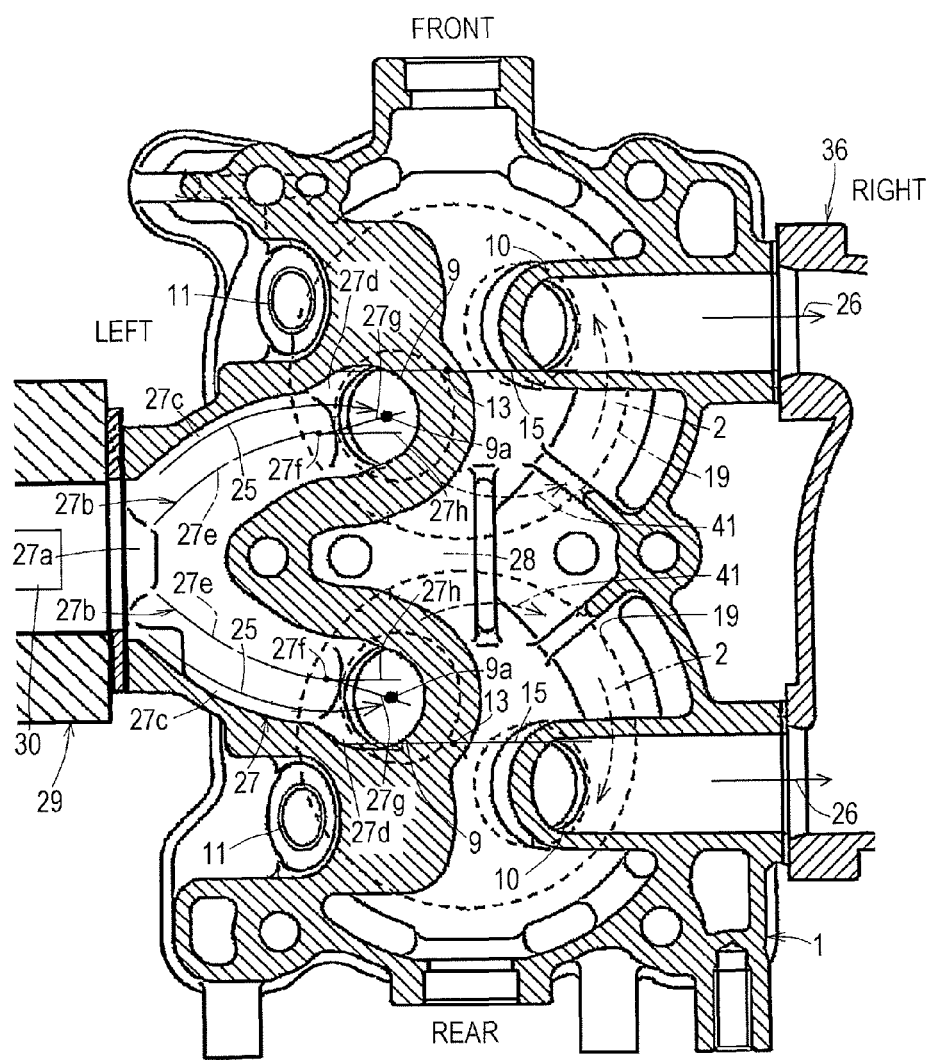
FIG. 5 is a horizontal cross-sectional plan view of a cylinder head and its surroundings of the engine in FIG. 1.
Figure 6:
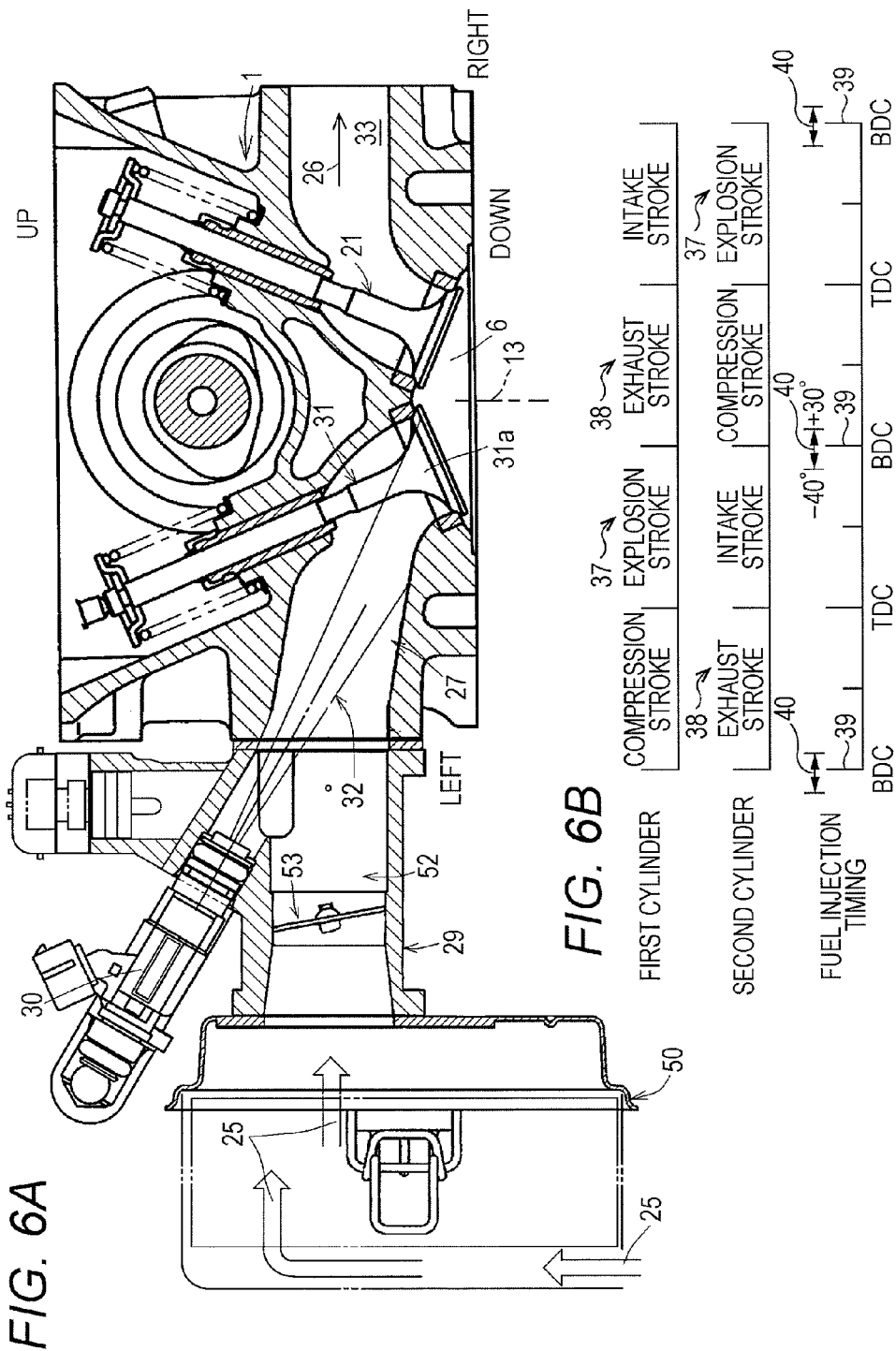
FIG. 6 are views for illustrating the engine in FIG. 1.

As shown in FIG. 5, the cylinder head (1) includes combustion chamber roofs (2)(2) of the adjacent cylinders (19) (19), the branched intake port (27) for introducing intake air (25)(25) into the adjacent cylinders (19)(19), and the intake valve ports (9)(9) provided at branched ends of the intake port (27).

When viewed parallel to the cylinder center axes (13)(13), assuming that the width direction of the cylinder head (1) as the horizontal direction, a port inlet (27a) of the intake port (27) is disposed just beside a partition wall (28) for partitioning the combustion chamber roofs (2)(2) of the adjacent cylinders (19)(19), port central axes (27b)(27b) of the intake port (27) are located closer to the partition wall (28) than the central virtual line (15) of each cylinder (19), the central virtual line passing the cylinder center axis (13)(13) and extending horizontally, and intake air (25)(25) is sucked from the intake valve ports (9)(9) along the wall between the cylinders.

When viewed parallel to the cylinder center axes (13)(13), the intake port (27) is configured with a pair of curved ports (27c)(27c) protrudingly curving in a direction away from the partition wall (28) near the port inlet (27a) and a pair of straight ports (27d)(27d) extending straight toward the center of the combustion chamber roof (2) near the intake valve ports (9)(9).

When viewed parallel to the cylinder center axes (13)(13), tangential virtual lines (27h)(27h) extending from endpoints (27f)(27f) of respective curved port central axes (27e)(27e) along tangent lines of the endpoints (27f)(27f) pass the intake valve ports (9)(9), and straight port central axes (27g)(27g) extending from the endpoints (27f)(27f) of the respective curved port central axes (27e)(27e) are further away from the partition wall (28) than the respective tangential virtual lines (27h)(27h).

The intake air (25)(25) bent through the curved ports (27c)(27c) passes the straight ports (27d)(27d), and is sucked from the intake valve ports (9)(9) along the wall between the cylinders.

A position at which fuel (32) hits is as follows.

As shown in FIG. 6(A), there are provided the throttle body (29) attached to the cylinder head (1), the fuel injector (30) attached to the throttle body (29), and the intake valve (31) provided in each intake valve port (9).

The intake valve (31) is a poppet valve, and the fuel (32) injected from the fuel injector (30) hits against the valve head (31a) of the intake valve (31).

An air intake device and a fuel injection device are configured as follows.

As shown in FIG. 5, when viewed from the direction parallel to the cylinder center axis (13), assuming that the arrangement direction of the two cylinders (19)(19) is the frontward and rearward direction, and the width direction of the cylinder head (1) orthogonal to the frontward and rearward direction is the horizontal direction, one throttle body (29) is used for the pair of adjacent front and rear cylinders (19)(19), the throttle body (29) is disposed lateral to (on the left side of) the cylinder head (1) and, as shown in FIG. 6(A), the throttle body (29) is provided with one throttle intake passage (52) and one throttle valve (53).

As shown in FIG. 6(A), one fuel injector (30) is attached to the throttle body (29).

Assuming that the direction of the cylinder center axis (13) is the vertical direction, the side of the cylinder head cover (43) is the upper side, and the side of the cylinder block (42) is the lower side as shown in FIG. 6(A), when viewed from the direction parallel to the direction of the mounting the crank shaft (48), the fuel (32) is injected into the intake port (27) obliquely downward, and hits against the valve heads (31a) of a pair of intake valves (31) at the same time.

The injection timing of the fuel (32) is as follows.

As shown in FIG. 6(B), the fuel (32) is injected from the fuel injector (30) into the intake port (27) within a crank angle range (40) from preceding 40 degrees to subsequent 30 degrees of a bottom dead center (39) partitioning an explosion stroke (37) and an exhaust stroke (38) of one cylinder (19).

The bottom dead center (39) partitions an intake stroke and a compression stroke of the other cylinder (19).

All or part of the fuel (32) may be injected within the crank angle range (40).

An exhaust treatment member (35) is configured as follows.

Figure 7:
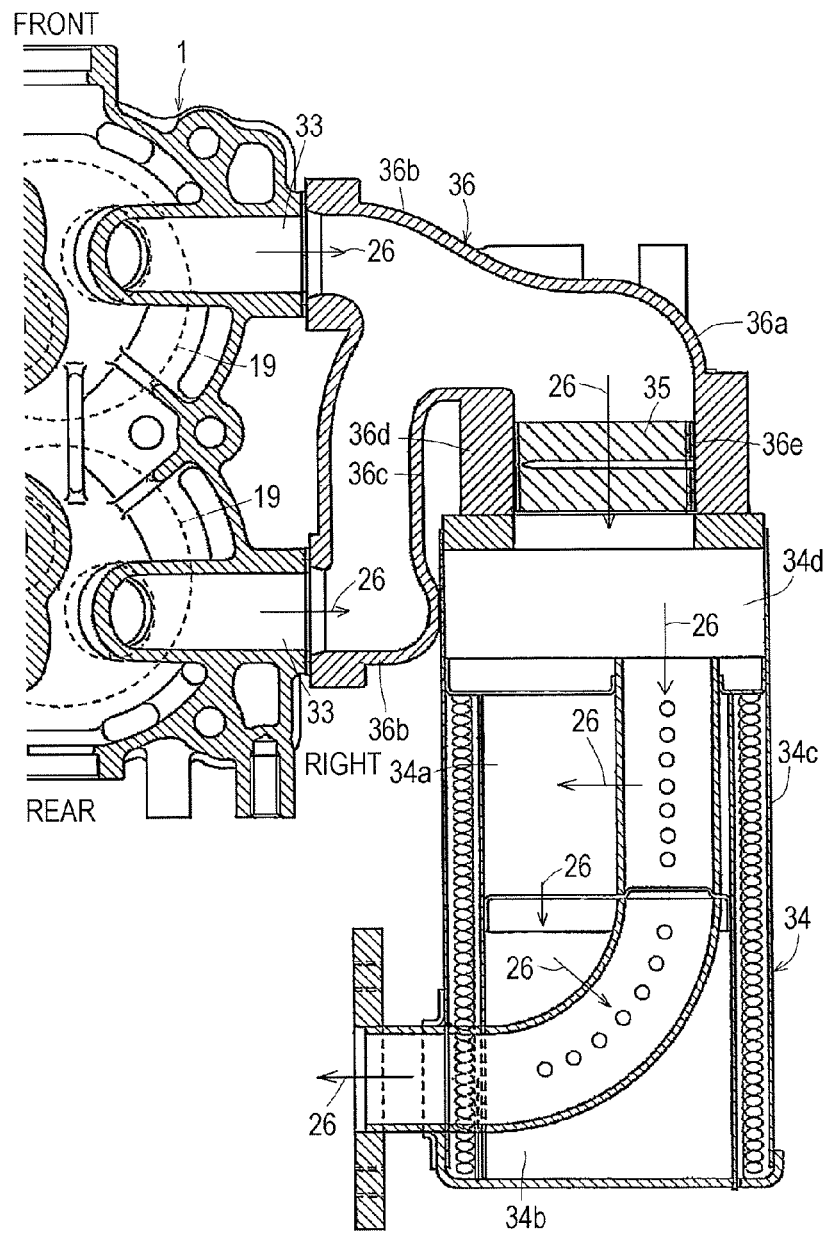
FIG. 7 is a horizontal cross-sectional plan view of a cylinder head, an exhaust manifold, and an exhaust muffler for use in the engine in FIG. 1.

As shown in FIG. 7, the engine includes an exhaust port (33), an exhaust muffler (34), and the exhaust treatment member (35) which are provided in the cylinder head (1).

The exhaust muffler (34) includes muffling chambers (34a) (34b), and the exhaust treatment member (35) is disposed between the exhaust port (33) and the muffling chambers (34a)(34b), and is made of stainless steel such that the surface of a stainless steel material makes contact with the exhaust gas (26).

As shown in FIG. 7, the engine includes an exhaust manifold (36) attached to the cylinder head (1), and the exhaust treatment member (35) is disposed in the exhaust manifold (36).

The exhaust manifold (36) is configured with a collector section (36a) and a branch section (36b) branched from the collector section (36a) to the exhaust port (33) of each cylinder (19), and an exhaust outlet (36e) is provided at the terminating end of the collector section (36a).

An exhaust muffler body (34c) is long in the frontward and rearward direction, and includes an exhaust inlet (34d) at its front end, a first muffling chamber (34a), and a second muffling chamber (34b) in this order. The exhaust gas (26) passes through the exhaust inlet (34d), the first muffling chamber (34a), and the second muffling chamber (34b) of the exhaust muffler body (34c) in this order.

As shown in FIG. 7, the exhaust treatment member (35) is disposed in the collector section (36a) of the exhaust manifold (36).

As shown in FIG. 7, a circumferential wall (36d) of the collector section (36a) into which the exhaust treatment member (35) is incorporated is disposed along a circumferential wall (36c) of the branch section (36b) of the exhaust manifold (36).

The exhaust treatment member (35) is disposed in the exhaust outlet (36e) of the collector section (36a) of the exhaust manifold (36).

The exhaust treatment member (35) is configured as follows.

In this embodiment, the exhaust treatment member (35) is formed of a three-dimensional mesh structure made of a stainless steel material. That is, the exhaust treatment member (35) is formed of stainless steel wool. The exhaust treatment member (35) does not carry a catalyst component made of noble metal.

The exhaust treatment member (35) may be formed of a stainless steel honeycomb.

Next, Second embodiment will be described.

Second embodiment is different from First embodiment only in following points.

As shown in FIGS. 10(A) and 10(B), a pair of right and left squish area maximum-width sections (14) are provided.

As shown in FIGS. 10(A) and 10(B), a spark-plug recessed section (18) is formed in the opposed section (7) having the spark-plug attachment hole (11), out of the opposed sections (7)(8) of the combustion chamber recessed section (6).

The spark-plug attachment hole (11) is opened at the bottom end of the spark-plug recessed section (18).

As shown in FIG. 10(A), when viewed from the direction parallel to the cylinder center axis (13), the spark-plug recessed section (18) is provided in a position not to overlap the central virtual line (15).

As shown in FIG. 10(B), an inner circumferential surface (18a) of the spark-plug recessed section (18) has a central axis (11a) in common with the spark-plug attachment hole (11), and is a partial circumferential surface of a conical frustum extending toward the combustion chamber recessed section (6).

As shown in FIG. 10(B), all of the spark discharge section (16) at the tip of the spark plug (24) is disposed in the spark-plug recessed section (18). Part of the spark discharge section (16) at the tip of the spark plug (24) may be disposed in the spark-plug recessed section (18).

The other configuration of this embodiment is the same as that of First embodiment, and the same constituents in FIGS. 10(A) and 10(B), and FIG. 11 as those in First embodiment are given the same reference numerals as in FIG. 1 to FIG. 9.

Next, Third embodiment will be described.

As shown in FIG. 12, Third embodiment is different from First embodiment in that the exhaust treatment member (35) is disposed in the exhaust inlet (34d) of the exhaust muffler body (34c), and a circumferential wall (34e) of the exhaust inlet (34d) of the exhaust muffler body (34c) into which the exhaust treatment member (35) is incorporated is disposed along the circumferential wall (36c) of the branch section (36b) of the exhaust manifold (36).

The other configuration of this embodiment is the same as that of First embodiment, and the same constituents in FIG. 12 as those in First embodiment are given the same reference numerals as in FIG. 7.

The configuration of the exhaust treatment member (35) in Third embodiment may be applied to Second embodiment.

Examples of stainless steel that can be preferably used for the exhaust treatment member (35) in each of the embodiments include SUS316 defined in JIS (Japanese Industrial Standards).

SUS316 is austenitic stainless steel and has elements (element composition) including, by weight %, C of 0.08 or less, Si of 1.00 or less, Mn of 2.00 or less, P of 0.045 or less, Ni of 10.00 to 14.00, Cr of 16.00 to 18.00, and Mo of 2.00 to 3.00.

However, the type of stainless steel that can be used according to the present invention is not limited to this, and may be any type as long as its surface makes contact with the exhaust gas, thereby reducing the content of both hydrocarbon and $NO_x$ (nitrogen oxide) in exhaust gas.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A spark-ignition engine comprising:
   a cylinder head having a combustion chamber roof and a cylinder head-side squish surface provided on an outer periphery of the combustion chamber roof;
   a piston head having an outer periphery and a piston head-side squish surface provided on the outer periphery of a piston head opposed to the cylinder head-side squish surface;
   a combustion chamber section recessed at a center of the combustion chamber roof;
   an intake valve port provided on one opposed section of two opposed sections of the combustion chamber recessed section;
   an exhaust valve port provided on another of the two opposed section; and
   a spark-plug attachment hole facing the combustion chamber recessed section,
   wherein the cylinder head-side squish surface and the piston head-side squish surface are upwardly inclined toward the combustion chamber recessed section, and in a vicinity of a compression top dead center a squish flow is ejected from a squish area formed between the cylinder head-side squish surface and the piston head-side squish surface toward a center of the combustion chamber recessed section,
   when viewed from a direction parallel to a cylinder center axis, given a central virtual line passing a squish area maximum-width section and the center of the combustion chamber recessed section, and one area a and another area b divided by the central virtual line, and
   one of the intake valve port and the exhaust valve port is provided in one area of any opposed section of the two opposed sections of the combustion chamber recessed section, and the spark-plug attachment hole is provided in the other area of the opposed section,
   such that a spark discharge section at a tip of a spark plug is provided in a position not to overlap the central virtual line when viewed from the direction parallel to the cylinder center axis.

2. The spark-ignition engine according to claim 1, wherein the intake valve port is provided in the one area of the one opposed section of the combustion chamber recessed section, and the exhaust valve port is provided in the other area of the other opposed section, and
   one area of the other opposed section serves as an intake guide surface, and the intake guide surface has a center axis in common with the intake valve port, and is a partial circumferential surface of a conical frustum extending toward a cylinder.

3. The spark-ignition engine according to claim 1, wherein when viewed from the direction parallel to cylinder center axis, the exhaust valve port is provided in a position to overlap the central virtual line, and a largest squish flow ejected from the squish area maximum-width section in the vicinity of an exhaust top dead center is directed to an exhaust port opposing surface at a valve head of an opened exhaust valve.

4. The spark-ignition engine according to claim 1, wherein when viewed from the direction parallel to cylinder center axis, in the other area b located on one side of the central virtual line, the spark-plug attachment hole is provided in one opposed section of the combustion chamber recessed section, the exhaust valve port is opened to the other opposed section, and an end part of the combustion chamber recessed section located between the spark-plug attachment hole and the exhaust valve port has a center axis in common with the exhaust valve port, and serves as an exhaust guide surface that is a partial circumferential surface of a conical frustum extending toward the piston head.

5. The spark-ignition engine according to claim 1, wherein at least part of the spark discharge section is disposed in the spark-plug attachment hole.

6. The spark-ignition engine according to claim 1, wherein a spark-plug recessed section is provided in the opposed section having the spark-plug attachment hole, out of the opposed sections of the combustion chamber recessed section, and the spark-plug attachment hole is provided at the bottom end of the spark-plug recessed section.

7. The spark-ignition engine according to claim 6, wherein when viewed from the direction parallel to the cylinder center axis, the spark-plug recessed section is provided in a position not to overlap the central virtual line.

8. The spark-ignition engine according to claim 6, wherein an inner circumferential surface of the spark-plug recessed section has a central axis in common with the spark-plug attachment hole, and is a partial circumferential surface of a conical frustum extending toward the combustion chamber recessed section.

9. The spark-ignition engine according to claim 6, wherein at least part of the spark discharge section at the tip of the spark plug is disposed in the spark-plug recessed section.

10. The spark-ignition engine according to claim 1, wherein the cylinder head 1 includes:

adjacent cylinders having respective combustion chamber roofs;

a branched intake port for introducing intake air into the adjacent cylinders; and respective intake valve ports provided at branched ends of the intake port, wherein when viewed from the direction parallel to respective cylinder center axes, assuming a width direction of the cylinder head as a horizontal direction, a port inlet of the intake port is disposed just beside a partition wall for partitioning the respective combustion chamber roofs of the adjacent cylinders, port central axes of the intake port are located closer to the partition wall than the central virtual line of each cylinder, the central virtual line passing the cylinder center axis and extending horizontally, and the intake air is sucked from the intake valve ports along a wall between the cylinders, when viewed from the direction parallel to the cylinder center axes, the intake port is configured with a pair of curved ports protrudingly curving in a direction away from the partition wall near the port inlet and a pair of straight ports extending straight toward the center of the combustion chamber roof near the intake valve ports, when viewed from the direction parallel to the cylinder center axes, tangential virtual lines extending from endpoints of respective curved port central axes along tangent lines of the endpoints pass the intake valve ports, and straight port central axes extending from the endpoints of the respective curved port central axes are further away from the partition wall than the respective tangential virtual lines, and the intake air bent through the curved ports passes the straight ports, and is sucked from the intake valve ports along the wall between the cylinders.

11. The spark-ignition engine according to claim 1, further comprising:

a throttle body attached to the cylinder head;

a fuel injector attached to the throttle body; and an intake valve provided in each intake valve port, wherein the intake valve is a poppet valve, and fuel injected from the fuel injector hits against a valve head of the intake valve.

12. The spark-ignition engine according to claim 1, further comprising:

a throttle body attached to the cylinder head;

a fuel injector attached to the throttle body; and an intake port provided to the cylinder head, wherein the fuel is injected from the fuel injector into the intake port within a crank angle range from preceding 40 degrees to subsequent 30 degrees of a bottom dead center of the piston head partitioning an explosion stroke and an exhaust stroke.

13. The spark-ignition engine according to claim 1, further comprising an exhaust port, an exhaust muffler, and an exhaust treatment member, which are provided in the cylinder head, wherein the exhaust muffler includes muffling chambers, and the exhaust treatment member is disposed between the exhaust port and the muffling chambers, and is made of stainless steel such that a surface of the stainless steel makes contact with an exhaust gas.

14. The spark-ignition engine according to claim 13, further comprising an exhaust manifold attached to the cylinder head, wherein the exhaust treatment member is disposed in the exhaust manifold.

15. The spark-ignition engine according to claim 14, wherein the exhaust treatment member is disposed in a collector section of the exhaust manifold.

16. The spark-ignition engine according to claim 15, wherein a circumferential wall of the collector section into which the exhaust treatment member is incorporated is disposed along a circumferential wall of a branch section of the exhaust manifold.

17. The spark-ignition engine according to claim 13, wherein the exhaust treatment member is disposed in an exhaust inlet of an exhaust muffler body.

18. The spark-ignition engine according to claim 17, further comprising an exhaust manifold attached to the cylinder head, wherein a circumferential wall of the exhaust inlet of the exhaust muffler body into which the exhaust treatment member is incorporated is disposed along a circumferential wall of a branch section of the exhaust manifold.

19. The spark-ignition engine according to claim 13, wherein
the exhaust treatment member is formed of a three-dimensional mesh structure made of a stainless steel material.

20. The spark-ignition engine according to claim 13, wherein the exhaust treatment member is formed of a stainless steel honeycomb.

* * * * *